T. B. DOOLITTLE.
REGISTER.
No. 170,351.   Patented Nov. 23, 1875.
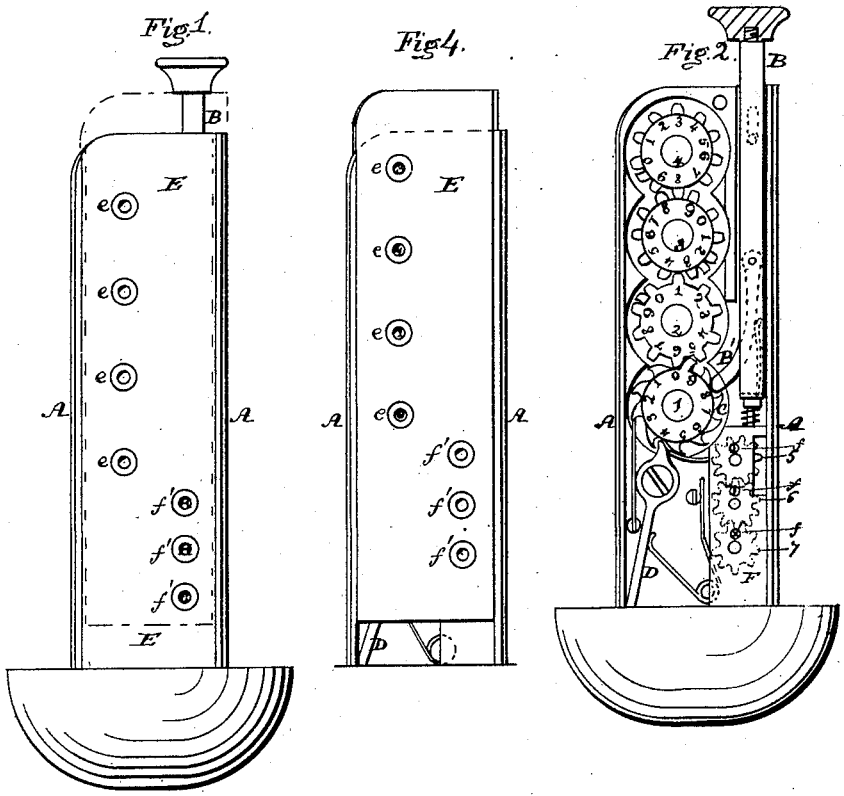
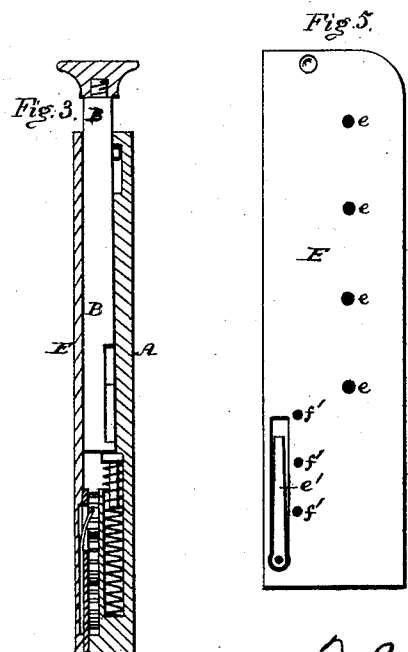
Witnesses:
F. B. Townsend
Colborne Brookes
Inventor:
T. B. Doolittle
By atty Sr C. W. Intire

UNITED STATES PATENT OFFICE.

THOMAS B. DOOLITTLE, OF BRIDGEPORT, CONNECTICUT.

IMPROVEMENT IN REGISTERS.

Specification forming part of Letters Patent No. 170,351, dated November 23, 1875; application filed August 26, 1875.

*To all whom it may concern:*

Be it known that I, THOMAS B. DOOLITTLE, of Bridgeport, in the county of Fairfield and State of Connecticut, have invented certain new and useful Improvements in Conductors' and Collectors' Alarms, &c.; and I do hereby declare that the following is a full and exact description thereof, reference being had to the accompanying drawings making a part of this specification.

My invention relates to improvements in that class of devices designed for use by conductors of railroad, street, and other cars, ticket-collectors, and others to denote automatically the number of fares, fees, or tickets collected by them; and the object of my invention is to so arrange the slide, door, or cover of the device that in the event of its being moved or opened with a view to inspecting or tampering with or altering the relative positions of the indicating mechanism, the slide, door, or cover shall automatically cause such movement or opening to be recorded, the nature of which will be fully explained by reference to the accompanying drawing, in which—

Figure 1 represents a front view, Fig. 2 an internal view, Fig. 3 a vertical section, and Figs. 4 and 5 detail views, of a register and alarm apparatus with my improvements applied thereto.

In each of the views similar letters of reference are employed to indicate corresponding parts wherever they occur.

A is the barrel or case, formed to receive a train of register-wheels, 1 2 3 4, a push-rod, B, spring-arm B', and ratchet-wheel C, or other suitable means for operating the train of gears 1 2 3 4, and striker or hammer D. The register-wheels 1 2 3 4 are covered, and the push-rod B held in place, by means of a sliding plate, E, which is provided with a series of holes or apertures, $e$, which, when the plate E is raised into the position shown by Fig. 2, enable the inspector of the register to see the number of fares, tickets, or fees which have been recorded by the instrument, but which, when the plate E is closed down, as shown by Fig. 1, shall be over the ends of the bearings of the gear-wheels, and prevent the inspection of the figures or signs recorded by the gear-wheels or indicating-surfaces. On the rear side of the plate E is applied a spring-projection, $e^1$, adapted, when the plate E is raised, to come in contact with the teeth of one of the train of gear-wheels 5 6 7, having provided on their sides a series of letters, figures, or signs capable of being exposed one after another through holes or apertures $f$ in a frame or covering, F, in which, by preference, the axes of the wheels 5 6 7 are supported.

The figures, letters, or signs for the time exposed through the openings $f$ may, by means of the openings $f'$ in the plate E, when such plate is closed down, as shown by Fig. 1, be exposed to view, and will remain unchanged so long as the plate E is not moved; but immediately the plate E is raised sufficiently, either to inspect the record of the instrument by bringing the openings $e$ over the recording-figures of the gears 1 2 3 4, or for the purpose of tampering with the instrument, the projection $e^1$ shall come in contact with the teeth of one of the train of gears 5 6 7, thereby causing the partial revolution of the wheels of such train and altering the letters, figures, or signs which shall be exposed to view when the plate is replaced or pushed down, thus effectually recording the fact of the raising or removal of the plate.

G is a spring-stop, formed with a conical or inclined end, and adapted to be received within a recess or depression, $e^3$, in the under side of the plate E, so as to prevent the accidental rising of the plate when the instrument is in use, the knob or handle of the push-rod forming a stop to the plate when raised to inspect the recording-figures.

Although I have shown my tell-tale device applied to a sliding plate capable of being raised or removed in order to obtain access to the interior mechanism, if preferred, it may be applied to hinged or other doors, covers, or cases for similar instruments, by arranging a projection or projections, a lever or series of levers, or other operating means, in such manner that when the door or case is opened or removed the projections or levers shall cause a train of indicating wheels or surfaces, 5 6 7, to be operated, as described, and indicate the fact that such opening or removal has taken place.

The wheels of the train of gears 5 6 7 in the arrangement shown are formed of different diameters, and, consequently, with different numbers of teeth, in order to give a greater and more complicated series of changes in the signs, figures, or letters recorded from time to time. They may, however, be formed of equal or any suitable diameter so long as they will gear and work together.

In place of employing a series of wheels, 5 6 7, geared into each other, as shown, a series of revolving disks, plates, or arms, provided with suitable signs, figures, or letters, may be employed as the recording means.

Having thus described my invention, what I claim, and desire to secure by Letters Patent, is—

In combination with a conductor's or collector's alarm, register, or punch, a series of surfaces provided with signs, figures, or letters, so arranged within the case or cover of the instrument as to be operated by and record any movement or opening of the door, cover, or case.

In witness that I claim the above as my invention I have hereunto set my hand this 26th day of August, 1875.

T. B. DOOLITTLE.

Witnesses:
COLBORNE BROOKES,
ARTHUR L. MCINTIRE.